US008051124B2

(12) United States Patent  
Salama et al.

(10) Patent No.: US 8,051,124 B2  
(45) Date of Patent: Nov. 1, 2011

(54) HIGH SPEED AND EFFICIENT MATRIX MULTIPLICATION HARDWARE MODULE

(75) Inventors: Yassir Salama, Rome, NY (US); Assem Salama, Fayetteville, NY (US); Dennis Fitzgerald, Rome, NY (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 1138 days.

(21) Appl. No.: 11/779,935

(22) Filed: Jul. 19, 2007

(65) Prior Publication Data

US 2009/0024685 A1    Jan. 22, 2009

(51) Int. Cl.  
*G06F 7/32* (2006.01)  
*G06F 7/52* (2006.01)

(52) U.S. Cl. .......................... 708/607; 708/520

(58) Field of Classification Search .................. 708/514, 708/520, 607  
See application file for complete search history.

(56) References Cited

U.S. PATENT DOCUMENTS

| | | | |
|---|---|---|---|
| 3,001,710 A | 9/1961 | Haynes | |
| 3,055,586 A | 9/1962 | Davis | |
| 3,157,779 A | 11/1964 | Cochrane | |
| 3,535,694 A | 10/1970 | Anacker et al. | |
| 3,621,219 A | 11/1971 | Washizuka et al. | |
| 4,588,255 A | 5/1986 | Tur et al. | |
| 5,226,171 A * | 7/1993 | Hall et al. ................... | 712/9 |
| 5,818,532 A | 10/1998 | Malladi et al. | |
| 5,903,312 A | 5/1999 | Malladi et al. | |
| 5,978,895 A | 11/1999 | Ogletree | |
| 6,014,144 A | 1/2000 | Nelson et al. | |
| 6,061,749 A | 5/2000 | Webb et al. | |

(Continued)

OTHER PUBLICATIONS

Jang et al., "Energy- and Time-Efficient Matrix Multiplication on FPGAs," IEEE Transactions on Very Large Scale Integration (VLSI) Systems, vol. 13, No. 11, Nov. 2005, pp. 1305-1319.*

(Continued)

*Primary Examiner* — Lewis Bullock, Jr.  
*Assistant Examiner* — Matthew Sandifer  
(74) *Attorney, Agent, or Firm* — Edell, Shapiro & Finnan, LLC (57) ABSTRACT

A matrix multiplication module and matrix multiplication method are provided that use a variable number of multiplier-accumulator units based on the amount of data elements of the matrices are available or needed for processing at a particular point or stage in the computation process. As more data elements become available or are needed, more multiplier-accumulator units are used to perform the necessary multiplication and addition operations. To multiply an N×M matrix by an M×N matrix, the total (maximum) number of used MAC units is "2*N−1". The number of MAC units used starts with one (1) and increases by two at each computation stage, that is, at the beginning of reading of data elements for each new row of the first matrix. The sequence of the number of MAC units is $\{1, 3, 5, \ldots, 2*N-1\}$ for computation stages each of which corresponds to reading of data elements for each new row of the left hand matrix, also called the first matrix. For the multiplication of two 8×8 matrices, the performance is 16 floating point operations per clock cycle. For an FPGA running at 100 MHz, the performance is 1.6 Giga floating point operations per second. The performance increases with the increase of the clock frequency and the use of larger matrices when FPGA resources permit. Very large matrices are partitioned into smaller blocks to fit in the FPGA resources. Results from the multiplication of sub-matrices are combined to form the final result of the large matrices.

21 Claims, 8 Drawing Sheets

U.S. PATENT DOCUMENTS

| | | | |
|---|---|---|---|
| 6,141,013 | A | 10/2000 | Nelson et al. |
| 6,195,674 | B1 | 2/2001 | Elbourne et al. |
| 6,349,379 | B2 | 2/2002 | Gibson et al. |
| 6,421,695 | B1 | 7/2002 | Bae et al. |
| 6,640,239 | B1 | 10/2003 | Gidwani |
| 6,681,052 | B2 | 1/2004 | Luna et al. |
| 6,877,043 | B2 | 4/2005 | Mallory et al. |
| 6,882,634 | B2 | 4/2005 | Bagchi et al. |
| 6,888,844 | B2 | 5/2005 | Mallory et al. |
| 6,891,881 | B2 | 5/2005 | Trachewsky et al. |
| 6,898,204 | B2 | 5/2005 | Trachewsky et al. |
| 6,912,638 | B2 | 6/2005 | Hellman et al. |
| 6,954,800 | B2 | 10/2005 | Mallory |
| 6,965,816 | B2 | 11/2005 | Walker |
| 6,968,454 | B2 | 11/2005 | Master et al. |
| 6,975,655 | B2 | 12/2005 | Fischer et al. |
| 6,986,021 | B2 | 1/2006 | Master et al. |
| 6,988,236 | B2 | 1/2006 | Ptasinski et al. |
| 6,993,101 | B2 | 1/2006 | Trachewsky et al. |
| 7,000,031 | B2 | 2/2006 | Fischer et al. |
| 7,027,055 | B2 | 4/2006 | Anderson et al. |
| 7,035,285 | B2 | 4/2006 | Holloway et al. |
| 7,044,911 | B2 | 5/2006 | Drinan et al. |
| 7,085,683 | B2 | 8/2006 | Anderson et al. |
| 7,107,464 | B2 | 9/2006 | Shapira et al. |
| 7,155,613 | B2 | 12/2006 | Master et al. |

OTHER PUBLICATIONS

Campbell et al., "Resource and Delay Efficient Matrix Multiplication Using Newer FPGA Devices," GLSVLSI, Apr. 2006, pp. 308-311.*

Ju-Wook Jang et al., "Energy-and Time-Efficient Matrix Multiplication on FPGAs," IEEE Transactions on Very Large Scale Integration (VLSI) Systems IEEE USA, vol. 13, No. 11, Nov. 2005, pp. 1305-1319.

Campbell S.J. et al., "Resource and Delay Efficient Matrix Multiplication Using Newer FPGA Devices," GLSVLSI, Apr. 30-May 2, 2006, Philadelphia, PA, pp. 308-311.

Dou Y. et al., "64-Bit Floating-Point FPGA Matrix Multiplication," FPGA, Feb. 20-22, 2005, Monterey, CA, pp. 86-95.

Ling Zhuo et al., "Scalable and Modular Algorithms for Floating-Point Matrix Multiplication on Reconfigurable Computing Systems," IEEE Transactions on Parallel and Distributed Systems, IEEE Service Center, Los Alamitos, CA, US, vol. 18, No. 4, Apr. 1, 2007, pp. 433-448.

European Search Report dated Jun. 24, 2009, cited in European Patent Application No. 08159750.2.

Masato Nagamatsu et al., "A 15-ns 32×32-b CMOS Multiplier with an Improved Parallel Structure," IEEE Journal of Solid-State Circuits, vol. 25, No. 2, Apr. 1990.

F. Bensaali et al., "Accelerating Matrix Product on Reconfigurable Hardware for Image Processing Applications," IEE Proc.-Circuits Devices Syst., vol. 152, No. 3, Jun. 2005.

Grazia Lotti et al., "Application of Approximating Algorithms to Boolean Matrix Multiplication," IEEE Transactions on Computers, vol. C-29, No. 10, Oct. 1980.

Ju-Wook Jang et al., "Energy- and Time-Efficient Matrix Multiplication on FPGAs," IEEE Transactions on Very Large Scale Integration (VLSI) Systems, vol. 13, No. 11, Nov. 2005.

Manojkumar Krishnan et al., "SRUMMA: A Matrix Multiplication Algorithm Suitable for Clusters and Scalable Share Memory Systems," Proceedings of the 18th International Parallel and Distributed Processing Symposium (IPDPS'04), 2004 IEEE.

Keqin Li, "Scalable Parallel Matrix Multiplication on Distributed Memory Parallel Computers," 2000 IEEE.

Keqin Li et al., "Fast and Processor Efficient Parallel Matrix Multiplication Algorithms on a Linear Array with a Reconfigurable Pipelined Bus System," IEEE Transactions on Parallel and Distributed Systems, vol. 9, No. 8, Aug. 1998.

Yun Yang et al., "High-Performance Systolic Arrays for Band Matrix Multiplication," 2005 IEEE.

* cited by examiner

$$A \times B = C$$

$$A = \begin{pmatrix} A1 & A2 \\ A3 & A4 \end{pmatrix} \quad B = \begin{pmatrix} B1 & B3 \\ B2 & B4 \end{pmatrix}$$

$$C = \begin{pmatrix} C1 & C2 \\ C3 & C4 \end{pmatrix}$$

FIG. 7B
SECOND CLOCK CYCLE

FIG. 6

FIG. 7A
FIRST CLOCK CYCLE

HIGH SPEED AND EFFICIENT MATRIX MULTIPLICATION HARDWARE MODULE

FIELD OF THE INVENTION

The present invention relates to matrix multiply hardware module or core, and more particularly to the use of a variable number of multiplier-accumulators based on the data elements to be multiplied during stages of a matrix multiplication operation.

BACKGROUND OF THE INVENTION

Matrix multiplication is a necessary computation operation in many scientific and engineering applications. For example, navigation and control applications often require multiplication of matrices, sometimes very large matrices. Researchers have looked for solutions to enhance the performance of the matrix multiplication.

Matrix multiplication requires significant computation resources. To multiply two N×N matrices, N*N*N multiplication operations and (N−b 1)*N*N addition operations are needed. All matrix multiplication solutions depend upon either distributed data or distributed operations. However, all matrix multiplication solutions heretofore known are based on the assumption that there are a fixed number of available multipliers and accumulators.

Certain applications of matrix multiplication operations require highly efficient uses of resources in order to produce the result quickly using minimal computation and resources and consuming as little power as possible. Examples of such applications are in space vehicles and other equipment that carry finite power supplies.

SUMMARY OF THE INVENTION

Briefly, a matrix multiplication module and matrix multiplication method are provided that use a variable number of multiplier-accumulator units based on the amount of data elements of the matrices are available or needed for processing at a particular point or stage in the computation process. As more data elements become available or are needed, more multiplier-accumulator units are used to perform the necessary multiplication and addition operations.

Accordingly, a matrix multiplication hardware module or device is provided comprising a plurality of multiplier-accumulator units each of which comprises a multiplier circuit that multiplies two data elements to produce a product value and an adder circuit that adds the product value with an addend value to produce a result value. The number of multiplier-accumulator units used when a multiplication computation is performed on first and second matrices varies depending on which computation stage corresponding to which row of the first matrix the multiplication computation is executing.

Similarly, a method for multiplying first and second matrices is provided comprising providing a plurality of multiplier-accumulator units, each of which is capable of multiplying one data element of the first matrix with a data element of the second matrix to produce a product value and adding the product value with an addend value to produce a result value; and using a number of said plurality of multiplier-accumulator units that increases as computation progresses from a first row of the first matrix to remaining rows of the first matrix.

DETAILED DESCRIPTION

According to the present invention, a matrix multiplication hardware module (also called a "core") is provided that uses a variable number of multiplier-accumulator (MAC) units based on the number of data elements available for processing. The number of MAC units used during a multiplication of two matrices varies over time depending on the stage of the computation of the matrices. In one embodiment, the number of MAC units increases over time during a computation of two matrices.

The total (maximum) number of used MAC units is based on the size of the matrices to be multiplied. For specific sizes of the matrices, the number of used MAC units increases according to the availability of data during a computation session of two matrices. For example, when reading the first element from each matrix, only one MAC unit is needed to perform the multiply/add operation. The more data that is read as the computation progresses through the matrices, the more MAC units are used to perform multiply/add operations. Thus, in one embodiment, the matrix multiplication module has a dynamically increasing number of MAC units.

Figure 1:
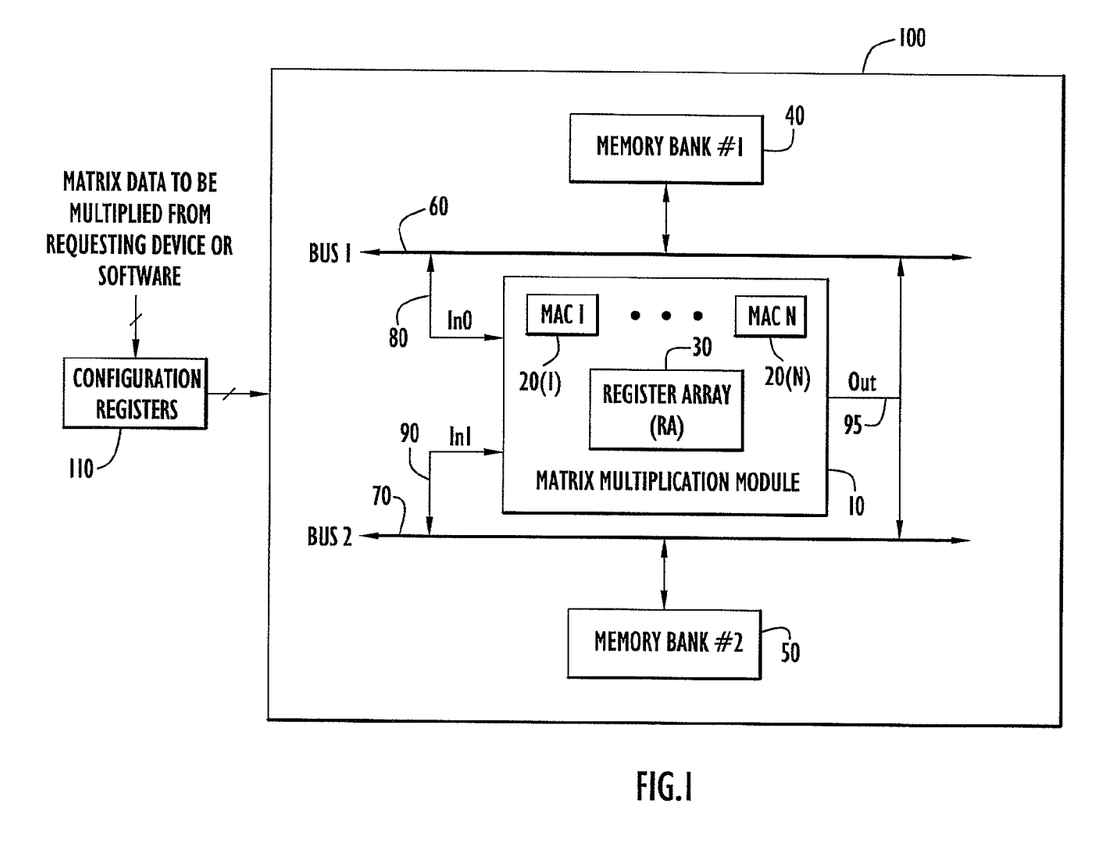
FIG. 1 is a block diagram of a matrix multiplication hardware module according to an embodiment of the invention.

Referring first to FIG. 1, the matrix multiplication hardware module is shown at reference numeral 10. The matrix multiplication hardware module 10 comprises a plurality of MAC units 20(1) to 20(N) and an array of dual port registers 30, referred to hereinafter as register array (RA) 30. There are first and second memory banks 40 and 50 and first and second buses 60 and 70 that supply data to and from the module 10. Each memory bank 40 and 50 is dedicated to one of the two input matrices to be multiplied. The separate data buses 60 and 70 can be read simultaneously by the module 10. With this architecture, it is possible to read one data element from each input matrix at the same time. The output result can be saved in either memory bank. Memory bank 40 is connected to bus 60 and memory bank 50 is connected to bus 70. The module 10 comprises first and second input ports (In0 and In1) 80 and 90, respectively, and an output port (Out) 95. Bus 60 connects to the first input port 80 and the bus 70 connects to the second input port 90. The output port 95 of the matrix multiply module can be connected to either bus 60 or 70.

The box shown at reference numeral 100 in FIG. 1 is provided to indicate that the components within the box 100 may be implemented in any programmable or fixed logic technology, such as a field programmable gate array (FPGA), application specific integrated circuit (ASIC), reconfigurable fixed logic circuits, programmable computing fabrics, etc. The data elements for the first and second matrices to be multiplied are received from the requesting device or software by configuration registers 110. The configuration registers 110 configure the matrix multiplication module 10 according to the dimensions of the first and second matrices.

Figure 2:
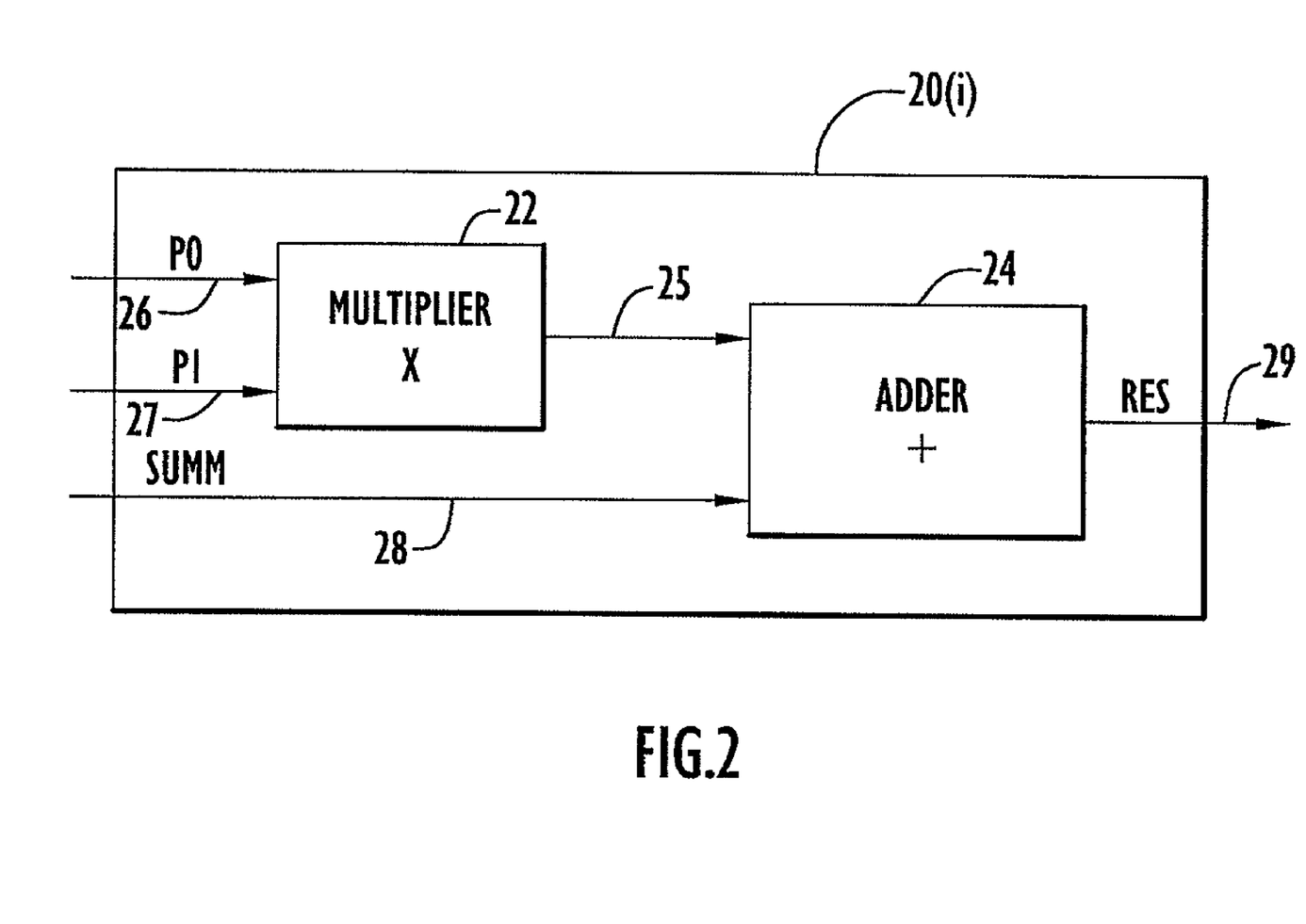
FIG. 2 is a block diagram of a multiplier-accumulator unit used in the matrix multiplication hardware module according to embodiments of the present invention.

Turning to FIG. 2, the ports of a MAC unit 20(i) are described. The MAC unit 20(i) comprises a multiplier circuit 22 and an adder circuit 24. An output 25 of the multiplier circuit is connected to one input of the adder circuit. A summation (SUMM) port 28 is connected to another input of the adder circuit 24. As described hereinafter, the SUMM port 28 receives an addend value from the result value generated by the adder circuit 24 and supplied to output 25 that was computed at a prior computation cycle. There are two input ports (P0 and P1) 26 and 27, respectively, that supply the two data elements to the MAC unit 20(i) to be multiplied. The input port 26 is connected to the first input 80 that in turn connects to the first bus 60 from which data elements of the first matrix are obtained. Similarly, the input port 27 is connected to the second input 90 that in turn connects to the second bus 70 from which data elements of the second matrix are obtained. Thus, when two matrices are being multiplied, each MAC unit receives a data element of a first matrix and a data element of a second matrix. The SUMM port 28 is the third input port and in operation it receives data from another MAC unit. The output port 29 of the MAC unit 20(i) contains the result (RES) data that is the sum of the data on the SUMM port and the data on the output 25 of the multiplier 22.

Figure 3:
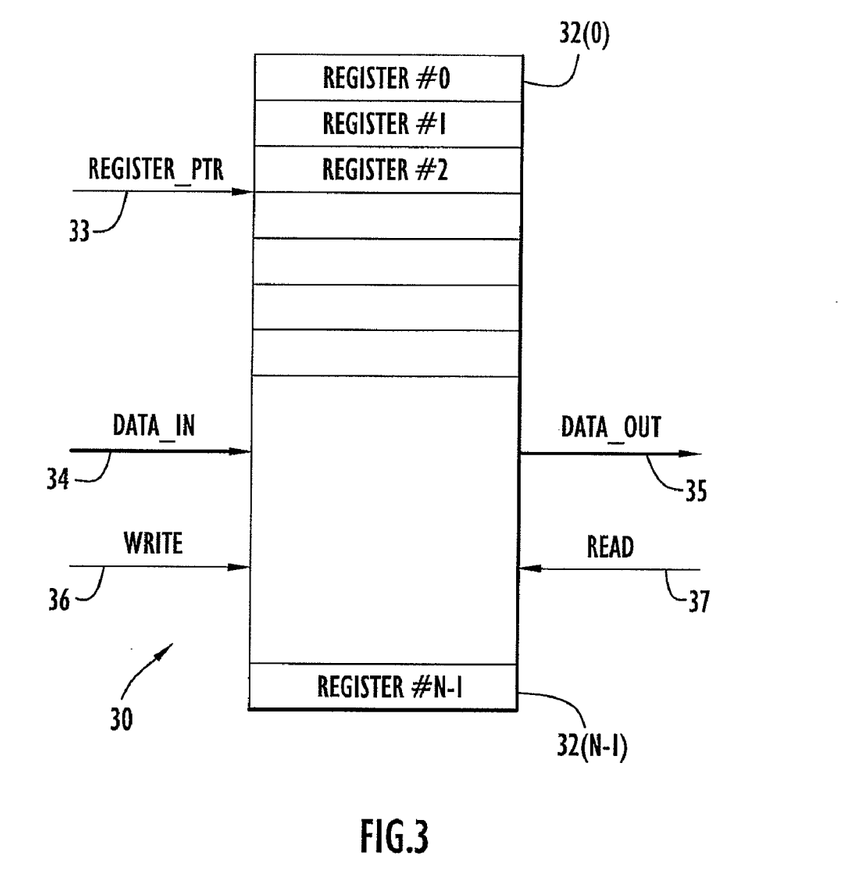
FIG. 3 is a block diagram of a dual port register array forming a part of the matrix multiplication hardware module according to an embodiment of the invention.

Reference is now made to FIG. 3 where the register array (RA) 30 is shown in more detail. The RA 30 is a type of register array block that comprises an array (plurality) of registers that can be written to via one port and read from via another port. The RA 30 comprises "N" registers 32(0) to 32(N−1) addressed as "Register #0" to "Register #N−1". Each register cell comprises a number of bits equal to the number of bits needed to represent the data elements of the matrices to be multiplied.

A register pointer (Register_Ptr) 33 is used to point to a particular register in the array to be read from or written to. Input data bus (Data_In) 34 is a bus used to write to any of the registers in the register array. Output data bus (Data_Out) 35 is a bus used to read from any of the registers in the register array. A write input signal (Write) 36 is used to signal the write operation of the input data to any of the registers in the register array. A read input signal (Read) 37 is used to signal the read operation of the output data from any of the registers in the register array.

Thus, the RA 30 is a storage unit comprising a plurality of storage locations, each of which stores data elements from rows of the first matrix and from columns of the second matrix supplied to MAC units during one computation stage for use in a subsequent computation stage (actually in several subsequent computation stages). Any array of dual port storage locations may be used to serve the function of the RA 30, such as dual port block RAM, or dual port memory chips.

As indicated above, the number of used MAC units depends on the size of the matrices to be multiplied. Two simple examples are provided to illustrate operation of the matrix multiplication module 10. The entire multiplication operation is performed while reading data from the two matrices to be multiplied. By the time all operand data is read, the product (result of multiplication of the two matrices) is ready. This assumes that there are two independent memory banks (as shown in FIG. 1) with each input matrix stored in a corresponding memory bank so that two elements, one from each matrix stored in the corresponding memory bank, can be read at the same time. Moreover, the number of computation stages associated with multiplying two matrices depends on, and is in fact, equal to the number of rows in the first matrix.

For example, data for a first matrix "m1" is stored in memory bank 40 and data for a second matrix "m2" is stored in memory bank 50. The result of the multiplication of matrix m1×m2 is stored in matrix "m3" in memory bank 40. Data from matrix m1 is read one element at a time through input port 80. Data from matrix m2 is read one element at a time through input port 90. The matrix multiplication module 10 performs the matrix multiplication process while reading data from the two memory banks 40 and 50. By the time the matrix multiplication module finishes reading data elements of the two input matrices m1 and m2, the output result is ready at the output port 95 to be stored in memory bank 40 as matrix m3.

There are no restrictions regarding the bus width. The only limitation is the resources available on the logic technology selected to implement the module 10.

Figure 4:
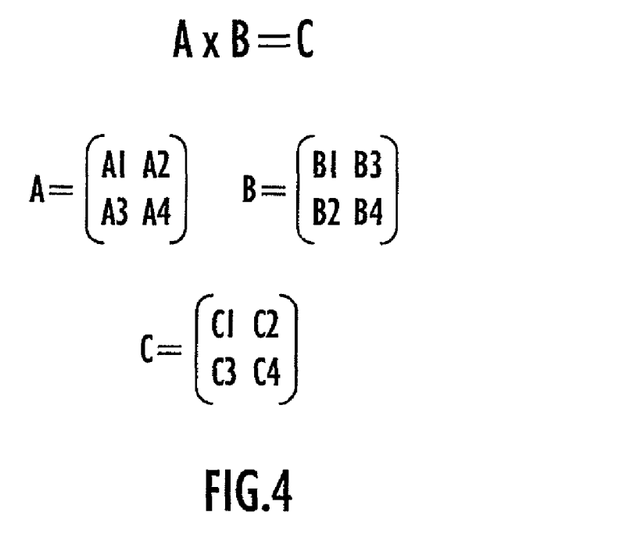
FIG. 4 is a diagram illustrating elements of two 2×2 matrices to be multiplied by the matrix multiplication module according to the invention.

Operation of the matrix multiplication module 10 is now described in more detail with reference to FIGS. 4-7. As shown in FIG. 4, in this example, each matrix in the computation matrix A and matrix B is a 2×2 matrix. The resultant matrix from the computation A×B is stored as matrix C.

The elements of the result matrix should be:

$C1 = A1*B1 + A2*B2$ $C2 = A1*B3 + A2*B4$ $C3 = A3*B1 + A4*B2$ $C4 = A3*B3 + A4*B4$

Figure 5:
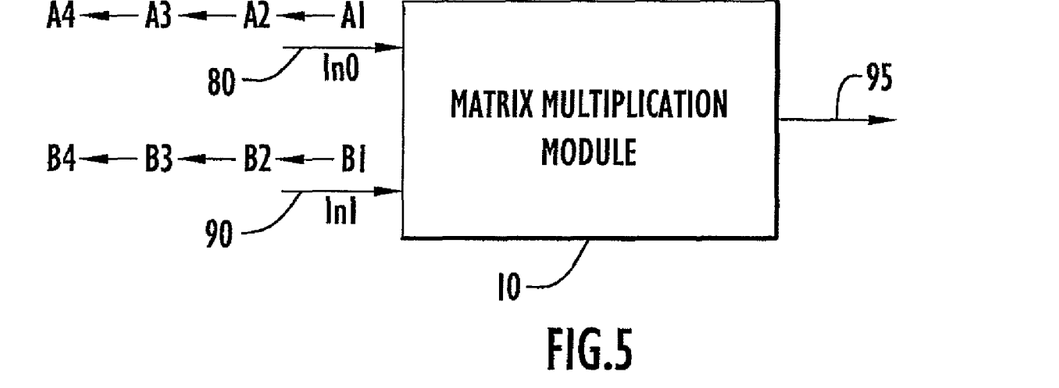
FIG. 5 illustrates input data flow for the multiplication of the two matrices shown in FIG. 4, according to an embodiment of the invention.

In the matrix multiplication module 10, the two input matrices are stored in memory so that the first matrix of the two to be multiplied (that is, the matrix on the left side, matrix A in this example) is stored "row-wise" in memory bank 40, and the second matrix (matrix B in this example) is stored "column-wise" in memory bank 50. As shown in FIG. 5, this means the data elements of the first matrix (matrix A) will be read out from memory sequentially in the following order:

$$A1 \to A2 \to A3 \to A4$$

The data elements of the second matrix (matrix B) will be read out from memory sequentially in the following order:

$$B1 \to B2 \to B3 \to B4$$

More specifically, as shown in FIG. 5, the input data flow for a 2×2 matrix multiplication operation is as follows. At the first clock cycle, data elements A1 and B1 will be at the inputs input ports 80 and 90, respectively. At the next clock cycle, data elements A2 and B2 will be at the inputs 80 and 90, respectively. At the next clock cycle, data elements A3 and B3 will be at the inputs 80 and 90, respectively. At the last clock cycle, data elements A4 and B4 will be at the inputs 80 and 90, respectively.

In the case of 2×2 matrix multiplication, the computation is divided into two computation stages for matrix A. During a first computation stage when the first row of matrix A is being read, the matrix multiplication module 10 uses a single MAC unit only. During a second computation stage when the second row of matrix A is being read, the matrix multiplication module uses three MAC units.

Figure 6:
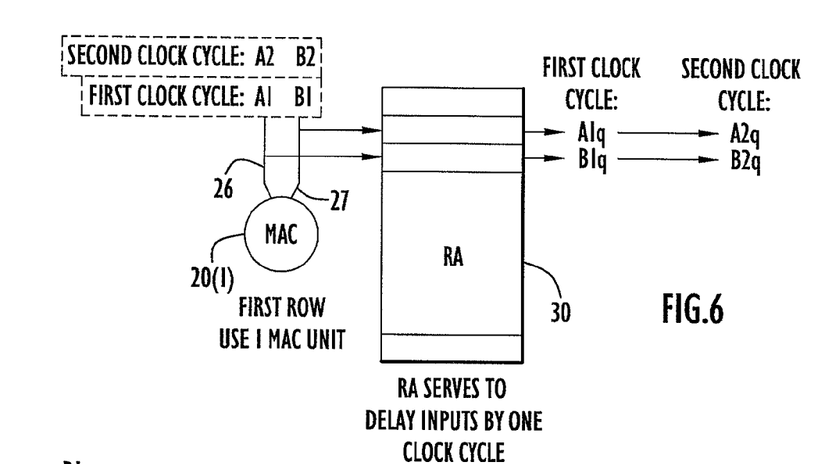
FIG. 6 illustrates operation of a first multiplier-accumulator unit in the matrix multiplication example shown in FIGS. 4 and 5.
Figure 7A:
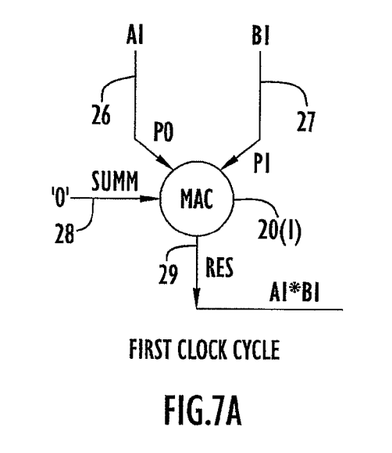
FIG. 7A is a diagram illustrating computations made by the first multiplier-accumulator during a first clock cycle depicted in FIG. 6.
Figure 7B:
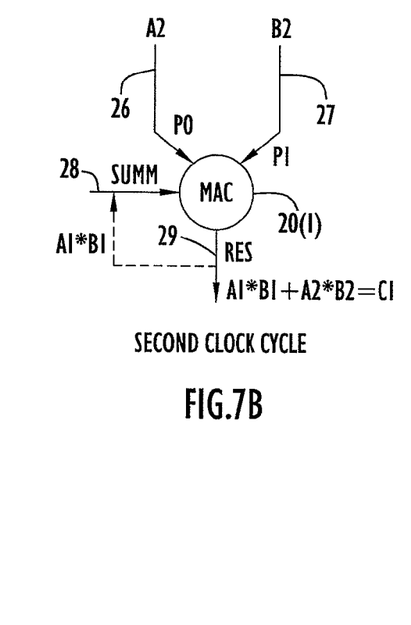
FIG. 7B is a diagram illustrating computations made by the first multiplier-accumulator during a second clock cycle depicted in FIG. 6.

Reference is now made to FIGS. 6, 7A, 7B, 8, 9A, 9B, 10A, 10B, 11A and 11B for a more detailed explanation of the operation of the matrix multiplication module on a per-clock cycle basis. FIGS. 6, 7A and 7B illustrate operation during the first and second clock cycles when a single MAC unit is used. In this example, the first and second clock cycles using a single MAC unit is the first computation stage. FIGS. 8, 9A, 9B, 10A, 10B, 11A and 11B illustrate operation during the third and fourth clock cycles (that make up the second computation stage) when three MAC units are used. Thus, a maximum of three MAC units are used at any one time when multiplying two 2×2 matrices and the entire matrix multiplication computation lasts a time interval of four clock cycles and there are two computation stages, each of which comprises two clock cycles.

During the first two clock cycles, data is applied to the inputs of the first MAC unit 20(1). Specifically, as shown in FIG. 7A with continued reference to FIG. 6, during the first clock cycle, the data elements A1 and B1 are read from memory (memory banks 40 and 50, respectively, as shown in FIG. 1) and applied to input ports 26 and 27, respectively, of a first MAC unit 20(1). At the same time, data elements A1 and B1 are applied to respective storage locations of the RA 30 in order to produce the delayed versions $A1q$ and $B1q$ of input data elements A1 and B1, respectively, for use during the second computation stage.

As shown in FIG. 7B with continued reference to FIG. 6, during the second clock cycle, data elements A2 and B2 are read from memory and applied to input ports 26 and 27, respectively, of the MAC unit 20(1) and at the same time to respective storage locations of the RA 30 to produce delayed versions of data elements $A2q$ and $B2q$, respectively, for use during the second computation stage. During the second clock cycle, the input at the SUMM port 28 is taken as the result from the multiplication result A1*B1 at the end of the first clock cycle. Thus, the output at port 29 at the end of the first clock cycle is looped back to the SUMM input port 28 to be ready for the computation to take place during the second clock cycle. The data elements A2 and B2 are supplied to input ports 26 and 27, respectively, so that the multiplier circuit in the MAC unit 20(1) computes A2*B2 and the adder circuit in the MAC unit 20(1) adds that result to A1*B1 at the SUMM input port 28. The final result A1*B1+A2*B2 is provided at the output port 29.

Thus, the output of the first MAC unit 20(1) after the second clock signal is the C1 data element of the result matrix C. It should be understood that $A1=A1q$, $A2=A2q$, $B1=B1q$ and $B2=B2q$.

Figure 8:
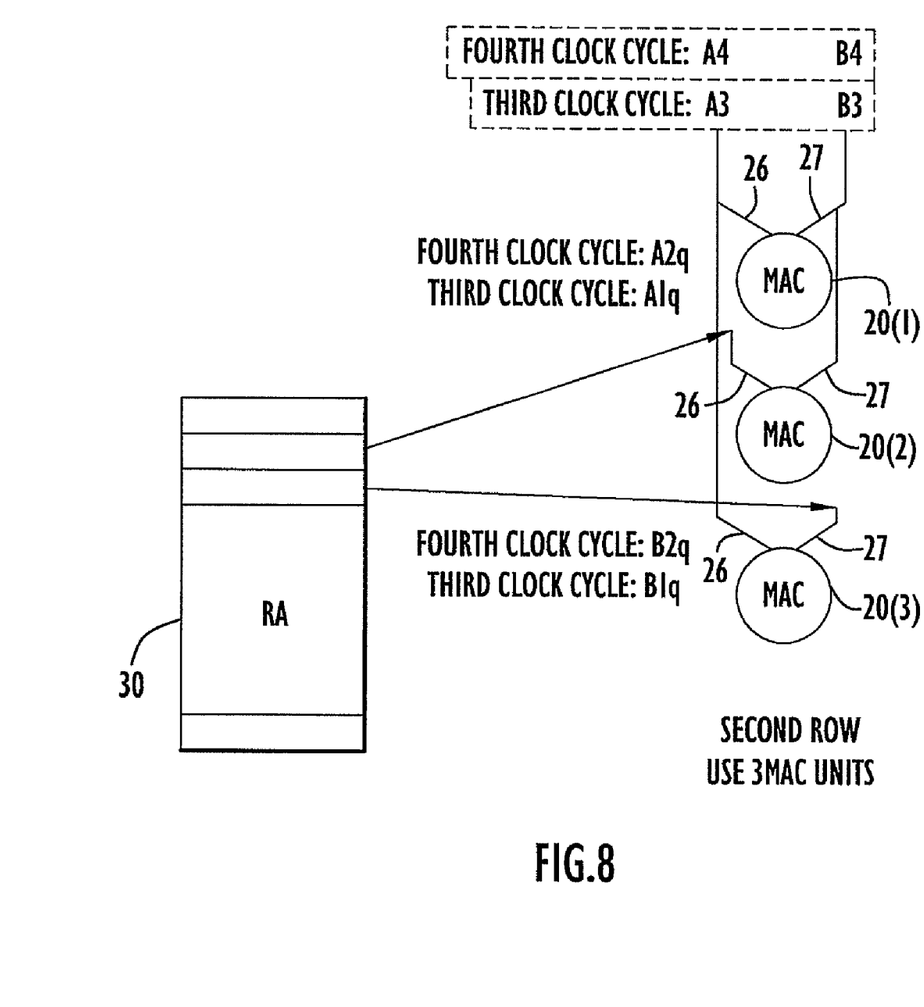
FIG. 8 illustrates operation of three multiplier-accumulator units in the matrix multiplication example shown in FIGS. 4 and 5.
Figure 9A:
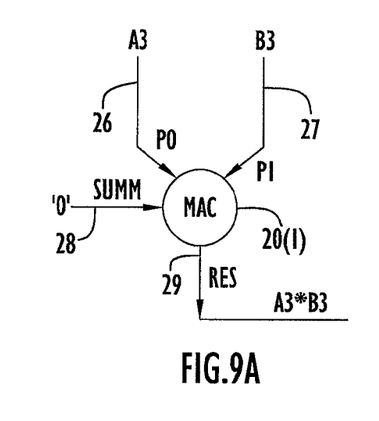
FIGS. 9A and 9B illustrate operation of a first multiplier-accumulator unit during successively clock cycles in the matrix multiplication example shown in FIGS. 4 and 5.
Figure 9B:
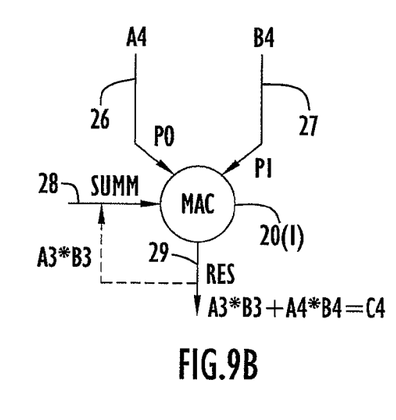
Figure 10A:
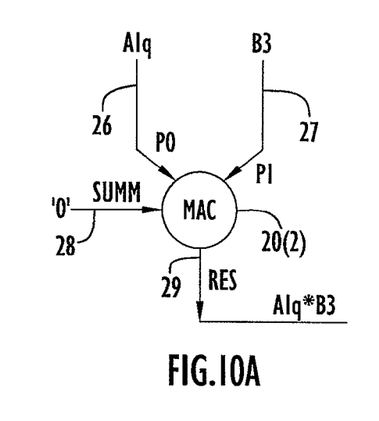
FIGS. 10A and 10B illustrate operation of a second multiplier-accumulator unit during successively clock cycles in the matrix multiplication example shown in FIGS. 4 and 5.
Figure 10B:
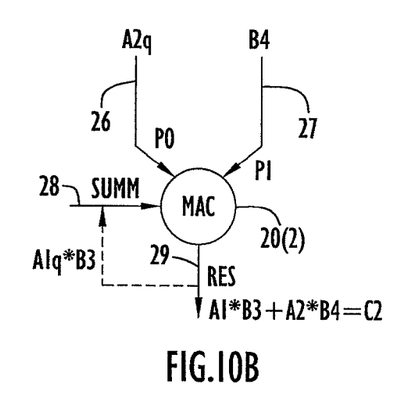
Figure 11A:
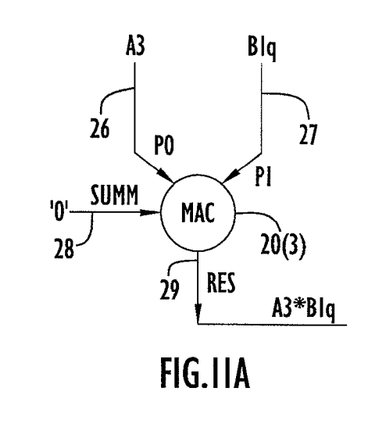
FIGS. 11A and 11B illustrate operation of a third multiplier-accumulator unit during successively clock cycles in the matrix multiplication example shown in FIGS. 4 and 5.
Figure 11B:
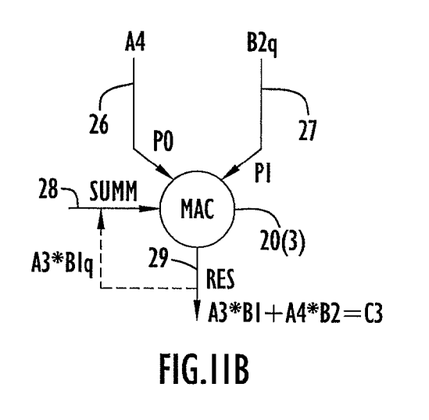

Turning to FIGS. 8, 9A, 9B, 10A, 10B, 11A and 11B, operation during the second computation stage comprising the third and fourth clock cycles is described. Two more MAC units 20(2) and 20(3) are used during the third and fourth clock cycles. FIGS. 9A, 10A and 11A illustrate operation of the three MAC units 20(1), 20(2) and 20(3) during the third clock cycle, and FIGS. 9B, 10B and 11B illustrate operation of the three MAC units 20(1), 20(2) and 20(3) during the fourth clock cycle. Data elements A3 and B3 are read from memory and applied to inputs 26 and 27, respectively, of the first MAC unit 20(1), as shown at FIGS. 8 and 9A. As shown in FIGS. 8 and 10A, Data element $A1q$ is read from the RA 30 and applied to input 26 of the second MAC unit 20(2) and data element B3 is read from memory and applied to the input 27 of MAC unit 20(2). Finally, during the third clock cycle, data element A3 is read from memory and applied to input 26 of the third MAC unit 20(3) and data element $B1q$ is read from the RA 30 and applied to input 27 of the third MAC unit 20(3), as shown in FIGS. 8 and 11A. Thus, during the third clock cycle, MAC unit 20(1) computes A3*B3, MAC unit 20(2) computes $A1q$*B3, and MAC unit 20(3) computes A3*$B1q$.

With reference to FIGS. 8 and 9B, during the fourth clock cycle, data elements A4 and B4 are read from memory and applied to inputs 26 and 27, respectively, of MAC unit 20(1). In addition, the result A3*B3 computed by MAC unit 20(1) during the third clock cycle is looped back at the beginning of the fourth clock cycle to the SUMM input port of MAC unit 20(1). Thus, during the fourth clock cycle, MAC unit 20(1) computes A4*B4 and adds that to A3*B3. The result output of MAC unit 20(1) at the end of the fourth clock cycle corresponds to the data element C4 of the result matrix C.

With reference to FIGS. 8 and 10B, during the fourth clock cycle, data element $A2q$ is read from the DPR 30 and applied to input 26 of MAC unit 20(2) and data element B4 is applied to input 27 of MAC unit 20(2). The result A1*B3 computed by MAC unit 20(2) during the third clock cycle is looped back at the beginning of the fourth clock cycle to the SUMM input port of MAC unit 20(2). Thus, during the fourth clock cycle MAC unit 20(2) computes A2*B4 and adds that value to A1*B3, and in so doing, outputs at its result output the data element C2 of the result matrix C.

Finally, with reference to FIGS. 8 and 11B, during the fourth clock cycle, data element A3 is applied to input 26 of the third MAC unit 20(3) and data element $B2q$ is read from the RA 30 and applied to the input 27 of MAC unit 20(3). The result A3*B1 computed by MAC unit 20(3) during the third clock cycle is looped back at the beginning of the fourth clock cycle to the SUMM input port of MAC unit 20(3). Consequently, during the fourth clock cycle, MAC unit 20(3) computes A4*B2 and adds the result with A3*B1 to produce at its output the data element C3 for the result matrix C.

Noteworthy from FIGS. 6, 7A and 7B is that the same MAC unit, MAC unit 20(1), is used when reading data elements for the two rows of matrix A. Therefore, MAC 20(1) is used for four clock cycles, MAC 20(2) is used for two clock cycles, and MAC 20(3) is used for two clock cycles. The SUMM input port to each MAC unit is reset to zero at the beginning of each computation stage (corresponding to a new row of data elements) read from the first matrix, matrix A.

Figures 12, 13A, 13B, 13C, 13D:
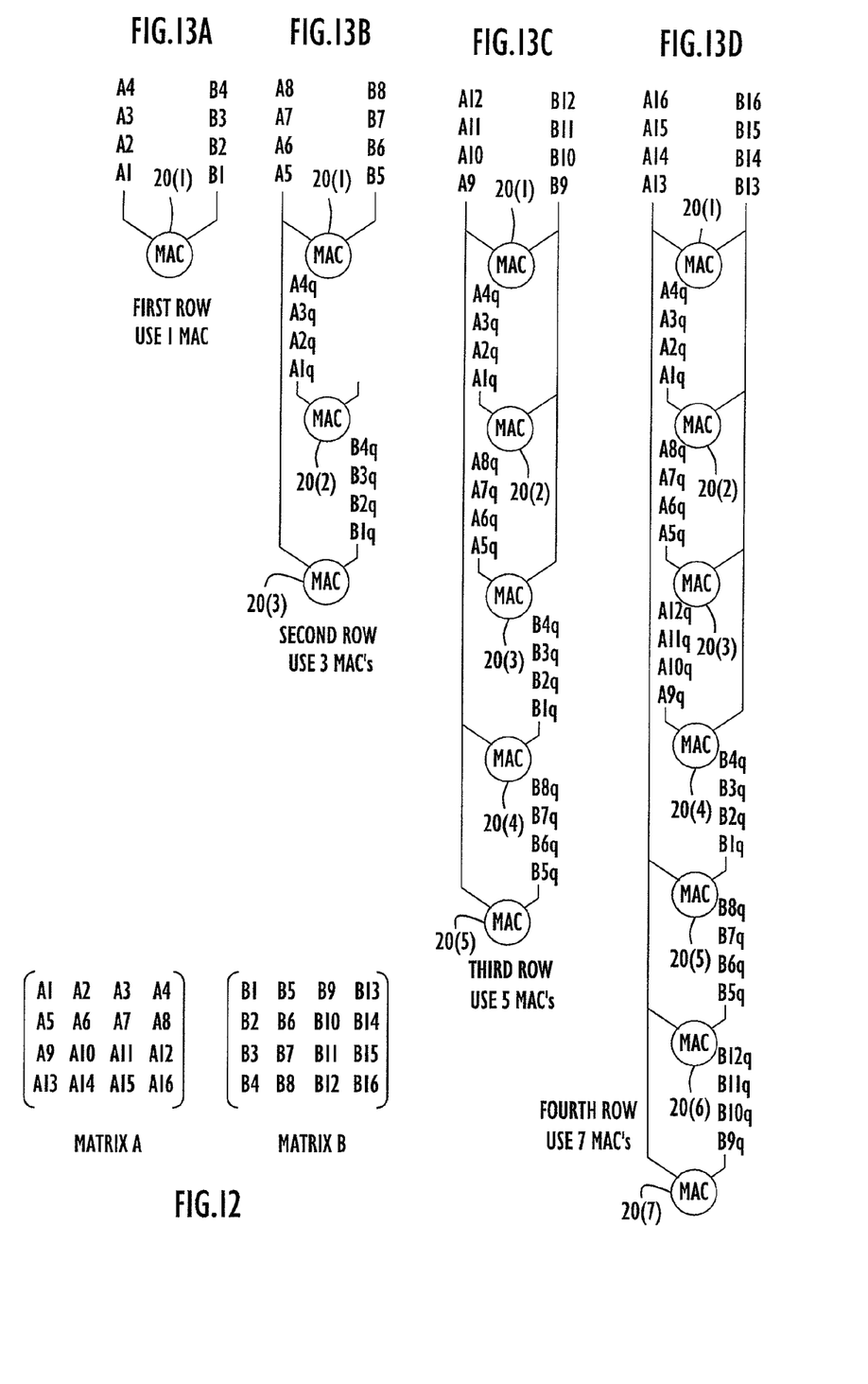
FIG. 12 illustrates an example of two 4×4 matrices to be multiplied by the matrix multiplication module according to an embodiment of the invention.
FIG. 13A illustrates operation of a first multiplier-accumulator unit during a first computation stage of the matrix multiplication example shown in FIG. 12.
FIG. 13B illustrates operation of three multiplier-accumulator units during a second computation stage of the matrix multiplication example shown in FIG. 12.
FIG. 13C illustrates operation of five multiplier-accumulator units during a third computation stage of the matrix multiplication example shown in FIG. 12.
FIG. 13D illustrates operation of seven multiplier-accumulator units during a fourth computation stage of the matrix multiplication example shown in FIG. 12.

The same concept is applied to the example of multiplying two 4×4 matrices. FIG. 12 illustrates two 4×4 matrices. FIGS.

13A, 13B, 13C and 13D show the details of the multiplication operations for multiplying matrices A and B shown in FIG. 12. The operation takes 16 clock cycles and uses no more than seven MAC units. FIG. 13A is the first computation stage, FIG. 13B is the second computation stage, FIG. 13C is the third computation stage and FIG. 13D is the fourth computation stage. Each of the computation stages shown in FIGS. 13A-13D lasts four clock cycles as indicated by the stack of four data elements about each MAC unit.

During the operation, one MAC unit is used when reading the first row of matrix A as shown in FIG. 13A. Two additional MAC units are used when reading the second row of matrix A, making a total of three MAC units, as shown in FIG. 13B. FIG. 13C shows that two more MAC units are used when reading from the third row of matrix A, making for a total of five MAC units. Finally, when reading from the fourth row of matrix A, a total of seven MAC units are used as shown in FIG. 13D. It should be understood from the 2×2 matrix multiplication example described above that each MAC unit shown in the 4×4 matrix multiplication example of FIGS. 12 and 13A-13D performs the "loop back" operation from its output to its SUMM input even though this is not shown in FIGS. 13A-13D. For example, during the first computation stage, at the second clock cycle, MAC unit 20(1) adds A1*B1 computed during the first clock cycle and looped back to the SUMM input of MAC unit 20(1) (though not shown in FIG. 13A), to A2*B2 computed during the second clock cycle. Further, the summation A1*B1+A2*B2 is looped back to the SUMM input of the MAC unit 20(1) such that during the third clock cycle, MAC unit 20(1) computes A3*B3 and adds that product value to A1*B1+A2*B2. Finally, during the fourth clock cycle of the first computation stage shown in FIG. 13A, the MAC unit 20(1) computes A4*B4 and adds that product value to A1*B1+A2*B2+A3*B3 looped back to the SUMM input of MAC unit 20(1) at the end of the third clock cycle. Thus, the first element, C1, of the resulting matrix C for multiplication of the matrices shown in FIG. 12, is computed by MAC unit 20(1) in four clock cycles. A similar loop back summation function is performed by each of the MAC units in the second, third and fourth computation stages represented by FIGS. 13B, 13C and 13D, respectively. In addition, data elements for the A and B matrices that are read from memory and supplied to a MAC unit during one computation stage are written to the RA for use during subsequent computation stages in much the same way as described above in the 2×2 matrix computation example.

During a first computation corresponding to a first row of the first matrix, a single MAC unit is used to multiply data elements of the first row of the first matrix with data elements of a first column of the second matrix. It should be understood that the first row of a matrix need not be the top row of the matrix and the first column of a matrix need not be the leftmost row of a matrix. In general, the total (maximum) number of MAC units depends on the total number of rows of the left side matrix. To multiply an N×M matrix by an M×N matrix, the total (maximum) number of used MAC units is "2*N−1". The number of MAC units used starts with one (1) during the first computation stage (first row of left matrix), and increases by two units at each subsequent computation stage (each subsequent row of the left matrix). The sequence of the number of MAC units is {1, 3, 5, . . . , 2*N−1} for the computation stages, where, again, each computation stage corresponds to reading of data elements for each new row of the left side matrix, also called the first matrix. The matrix multiplication module 10 operates such that during the jth computation stage corresponding to the jth row of the first matrix, the number of multiplier-accumulator units used is limited to the amount necessary in order to (i) multiply data elements for the jth row of the first matrix by data elements for the jth column and by data elements for all preceding columns of the second matrix and (ii) to multiply data elements for all rows of the first matrix preceding the jth row by data elements for the jth column of the second matrix. Moreover, during the jth computation stage, data elements for the jth row of the first matrix and for all preceding rows are stored in respective storage locations of the storage unit for use in computation stages after the jth computation stage. Further still, during each computation stage, each MAC unit that is used is operated for a plurality of clock cycles equal in number to a number of rows of the first matrix. The adder circuit in each MAC unit adds the product value computed by the multiplier circuit at the current clock cycle with the result value computed by the adder circuit at a previous clock cycle for that computation stage. If it is the beginning (first clock cycle) of a computation stage, then the SUMM input to each MAC unit is reset to 0.

The matrix multiplication module 10 is scalable and can be adapted for use on larger matrices. For example, the module 10 may be used to multiply 16×16 or 32×32 matrices if the module 10 is implemented in a relatively large FPGA. The matrix multiplication module 10 was built with a Xilinx Vertix2 FPGA (in a 3 million-gate FPGA chip form factor). For a multiplication of two 8×8 matrices, peak performance of 16 floating point operations per clock cycle was achieved. Running the FPGA at 100 MHz a peak performance of 1.6 giga-floating point operations per second (GFLOPS/sec) can be obtained. Thus, multiplying 16×16 or 32×32 matrices can be performed with a peak performance of 32 and 64 GFLOPS/sec, respectively, at a speed of 100 MHz. In general, the performance is equal to 2*N floating point operations per clock, where N is the number of rows of the first (left hand side) matrix regardless on the number of its columns.

The matrix multiplication examples described herein involve square matrices. However, the same concept can be applied for non-square matrices. The performance is based on the number of rows of the left hand matrix. Therefore, the same concept can be applied to left hand matrices with number of rows equals 16 or 32 to give performance of 3.2 or 6.4 GFLOPS/sec respectively running at 100 MHz clock. Performance increases with the use of faster clock frequencies.

The matrix multiplication module described above may be used to multiply non-square matrices. Multiplying a 4×N matrix and an N×4 matrix is similar to the example of multiplying two 4×4 matrices. The only difference is that N clock cycles are needed to read the rows of the first (left hand side) matrix. Nevertheless, the performance is the same as that described above: 8 floating point operations per clock cycle if the first matrix has 4 rows, and 16 floating point operations per clock cycle if the first matrix has 8 rows.

In the case of very large matrices, the resources of an FPGA chip may not be enough to process the multiplication process in one block. In this case, the matrices may be partitioned into smaller blocks such that each block can fit within the resources of the FPGA. The matrix multiplication operation is performed on a block-by-block basis, and then the results of the multiplication of the individual blocks are combined to form the resultant matrix.

However, the matrix multiplication module 10 may be employed to multiply two matrices using a variety of data types, such as 32-bit single precision floating point data and 64-bit double precision floating point data. Moreover, the module 10 may operate using 32-bit or 64-bit integer or fixed floating point data based on the width of the used memory banks. Further still, any non-standard data type may be used.

The register array of the RA 30 needs to be deep enough to store at least two rows of data elements (one row from each input matrix) when buffering data elements for use during subsequent clock cycles as explained in the foregoing. Otherwise, the size of the register array is left to the designer.

The system and methods described herein may be embodied in other specific forms without departing from the spirit or essential characteristics thereof. The foregoing embodiments are therefore to be considered in all respects illustrative and not meant to be limiting.

What is claimed is:

1. A matrix multiplication device for computing a multiplication of a first matrix with a second matrix, comprising:
   a first memory for storing data elements of the first matrix and a second memory for storing data elements of the second matrix;
   a plurality of multiplier-accumulator units each of which comprises a multiplier circuit configured to multiply two data elements to produce a product value and an adder circuit configured to add the product value with an addend value to produce a result value; and
   a storage unit comprising a plurality of storage locations;
   wherein the plurality of multiplier-accumulator units are configured to perform the multiplication of the first matrix with the second matrix in N computation stages, where N is the number of rows of the first matrix and N is greater than 1, and for each integer j from 1 to N, to read data elements of the jth row of the first matrix from the first memory and data elements of the jth column of the second matrix from the second memory during a jth computation stage, and to use 2j−1 of the plurality of multiplier-accumulator units during the jth computation stage to multiply data elements of the jth row of the first matrix by data elements of the jth column of the second matrix and by data elements of each column of the second matrix preceding the jth column and to multiply data elements of each row of the first matrix preceding the jth row by data elements of the jth column of the second matrix;
   wherein the storage unit is configured to store data elements of the first and second matrices that are applied to a multiplier-accumulator unit during a computation stage for use in a subsequent computation stage.

2. The device of claim 1, and further comprising a first input port and a second input port, a first bus that couples data between the first memory and the first input port and a second bus that couples data between the second memory and the second input port.

3. The device of claim 2, wherein each multiplier-accumulator unit comprises a first input that receives a data element of the first matrix and a second input that receives a data element of the second matrix.

4. The device of claim 3, during the jth computation stage corresponding to the jth row of the first matrix, the number of multiplier-accumulator units is used to multiply data elements for the jth row of the first matrix by data elements for the jth column of the second matrix and all preceding columns of the second matrix, and to multiply data elements for all rows of the first matrix preceding the jth row by data elements for the jth column of the second matrix.

5. The device of claim 4, wherein during the jth computation stage, data elements for the jth row of the first matrix and for all preceding rows are stored in respective storage locations of the storage unit for use in computation stages after the jth computation stage.

6. The device of claim 4, wherein during each computation stage, each multiplier-accumulator unit that is used is operated for a plurality of clock cycles equal in number to a number of rows of the first matrix.

7. The device of claim 6, wherein the adder circuit in each multiplier-accumulator unit adds the product value computed by the multiplier circuit at a current clock cycle with the result value computed by the adder circuit at a previous clock cycle for that computation stage.

8. The device of claim 3, wherein during a first computation stage corresponding to a first row of the first matrix, a single multiplier-accumulator unit is used to multiply data elements of the first row of the first matrix with data elements of the first column of the second matrix.

9. The device of claim 1, wherein when multiplying a first matrix comprising N×M data elements by a second matrix comprising M×N data elements, the number of multiplier-accumulator units used during a sequence of computation stages is $\{1, 3, 5 \ldots 2^*N-1\}$, for the jth computation stage from j =1 to N−1.

10. A matrix multiplication hardware core device that multiplies first and second matrices, comprising:
    a first memory for storing data elements of a first matrix and a second memory for storing data elements of a second matrix;
    a plurality of multiplier-accumulator units each of which is configured to multiply a first data element from the first matrix with a second data element from the second matrix to produce a product value and to add the product value with an addend value to produce a result value; and
    a storage unit comprising a plurality of registers that store data elements for one or more rows of the first matrix and for one or more columns of the second matrix for subsequent supply as input to a multiplier-accumulator unit; and
    wherein the plurality of multiplier-accumulator units are configured to perform the multiplication of the first matrix with the second matrix in N computation stages, where N is the number of rows of the first matrix and N is greater than 1, and for each integer j from 1 to N, to read data elements of the jth row of the first matrix from the first memory and data elements of the jth column of the second matrix from the second memory during a jth computation stage, and to use 2j−1 of the plurality of multiplier-accumulator units during the jth computation stage to multiply data elements of the jth row of the first matrix by data elements of the jth column of the second matrix and by data elements of each column of the second matrix preceding the jth column and to multiply data elements of each row of the first matrix preceding the jth row by data elements of the jth column of the second matrix;
    wherein the storage unit is configured to store data elements of the first and second matrices that are applied to a multiplier-accumulator unit during a computation stage for use in a subsequent computation stage.

11. The device of claim 10, during the jth computation stage corresponding to a jth row of the first matrix, the number of multiplier-accumulator units is used to multiply data elements for the jth row of the first matrix by data elements for the jth column of the second matrix and all preceding columns of the second matrix, and to multiply data elements for all rows of the first matrix preceding the jth row by data elements for the jth column of the second matrix.

12. The device of claim 11, wherein during the jth computation stage, data elements for the jth row of the first matrix and for all preceding rows are stored in respective storage locations of the storage unit for use in computation stages after the jth computation stage.

13. The device of claim 11, wherein during each computation stage, each multiplier-accumulator unit that is used is operated for a plurality of clock cycles equal in number to a number of rows of the first matrix.

14. The device of claim 13, wherein each multiplier-accumulator circuit comprises an adder circuit that adds the product value computed by the multiplier circuit at a current clock cycle with the result value computed by the adder circuit at a previous clock cycle for that computation stage.

15. The device of claim 10, wherein when the first matrix comprises N×M data elements and the second matrix comprises M×N data elements, the number of multiplier-accumulator units used during a sequence of computation stages is {1, 3, 5 ... 2*N−1}, for the jth computation stage from j =1 to N−1.

16. A method for multiplying first and second matrices, comprising:
- storing data elements of a first matrix in a first memory and storing data elements of a second matrix in a second memory;
- providing a plurality of multiplier-accumulator units to multiply one data element of the first matrix with a data element of the second matrix to produce a product value and to add the product value with an addend value to produce a result value;
- performing the multiplication of the first matrix with the second matrix in N computation stages where N is the number of rows of the first matrix and N is greater than 1;
- wherein for each integer j from 1 to N, reading data elements of the jth row of the first matrix from the first memory and data elements of the jth column of the second matrix from the second memory during a jth computation stage;
- using 2j−1 of the plurality of multiplier-accumulator units during the jth computation stage, multiplying data elements of the jth row of the first matrix by data elements of the jth column of the second matrix and by data elements of each column of the second matrix preceding the jth column, and multiplying data elements of each row of the first matrix preceding the jth row by data elements of the jth column of the second matrix; and
- storing in a storage unit data elements of the first and second matrices that are applied to a multiplier-accumulator unit during a computation stage for use in a subsequent computation stage.

17. The method of claim 16, further comprising during the jth computation stage corresponding to a jth row of the first matrix, using a number of multiplier-accumulator units to multiply data elements for the jth row of the first matrix by data elements for the jth column of the second matrix and all preceding columns of the second matrix, and to multiply data elements for all rows of the first matrix preceding the jth row by data elements for the jth column of the second matrix.

18. The method of claim 17, and further comprising, during the jth computation stage, storing data elements for the jth row of the first matrix and for all preceding rows in respective storage locations of the storage unit for use in computation stages after the jth computation stage.

19. The method of claim 17, and further comprising during each computation stage, operating each multiplier-accumulator unit for a plurality of clock cycles equal in number to the number of rows of the first matrix.

20. The method of claim 19, and further comprising adding a product value computed by a multiplier-accumulator unit at a current clock cycle with the result value computed by the result computed by the multiplier-accumulator unit at the previous clock cycle.

21. The method of claim 16, wherein when the first matrix comprises N×M data elements and the second matrix comprises M×N data elements, using comprises using the number of multiplier-accumulator units during a sequence of computation stages according to a sequence {1, 3, 5 ... 2*N−1}, for the jth computation stage from j =1 to N−1.

* * * * *